United States Patent [19]

Owashi

[11] Patent Number: 5,579,077
[45] Date of Patent: Nov. 26, 1996

[54] CAMERA EQUIPPED WITH A PHOTOMETRIC VALUE COMPENSATING DEVICE

[75] Inventor: Masao Owashi, Kanagawa-ken, Japan

[73] Assignee: Nikon Corporation, Tokyo, Japan

[21] Appl. No.: 400,816

[22] Filed: Mar. 8, 1995

[30] Foreign Application Priority Data

Mar. 11, 1994 [JP] Japan ................................ 6-067675

[51] Int. Cl.$^6$ .............................. G03B 7/08; G03B 17/20
[52] U.S. Cl. ........................ 396/51; 396/147; 396/234; 396/296
[58] Field of Search ............................. 354/409, 432, 354/429, 471, 474, 478, 476

[56] References Cited

U.S. PATENT DOCUMENTS

| | | | |
|---|---|---|---|
| 4,019,191 | 4/1977 | Miyata | 354/155 |
| 4,534,639 | 8/1985 | Konishi et al. | 354/432 |
| 4,652,109 | 3/1987 | Tsunekawa | 354/432 |
| 4,681,420 | 7/1987 | Suda et al. | 354/409 |
| 5,404,193 | 4/1995 | Harada | 354/409 |

Primary Examiner—W. B. Perkey
Attorney, Agent, or Firm—Oliff & Berridge

[57] ABSTRACT

A photometric value compensating device corrects the influence on the photometric value of a mark or character superimposed in the finder field of a camera when the finder field is finely divided for photo metering and makes it possible to always obtain the proper exposure value. The photometric value compensating device includes a finely divided photo metering device that divides the photographic field into multiple areas and measures the light intensity or brightness in each area and transmits information based on the measured light intensity as a photometric brightness value. A photographic information display device superimposes photographic information inside the finder field. A correction area determining device determines the photometric areas for which photometric value correction is necessary based on the brightness of the photographic information displayed in the photometric areas of the finely divided photo metering device. A correction device calculates a corrected brightness value based on the photometric brightness values obtained from photometric areas determined by the correction area determining device.

24 Claims, 7 Drawing Sheets

|   | 1 | 2 | 3 | 4 |
|---|---|---|---|---|
| A | Bvo(A1) | Bvo(A2) | Bvo(A3) | Bvo(A4) |
| B | Bvo(B1) | Bvo(B2) | Bvo(B3) | Bvo(B4) |
| C | Bvo(C1) | Bvo(C2) | Bvo(C3) | Bvo(C4) |
| D | Bvo | Bvo | Bvo | Bvo |

FIG.9

CAMERA EQUIPPED WITH A PHOTOMETRIC VALUE COMPENSATING DEVICE

BACKGROUND OF THE INVENTION

1. Field of the Invention

The present invention relates to a camera equipped with a photometric value compensation device that can superimpose photographic information in the finder field.

2. Description of Related Art

Figure 2:
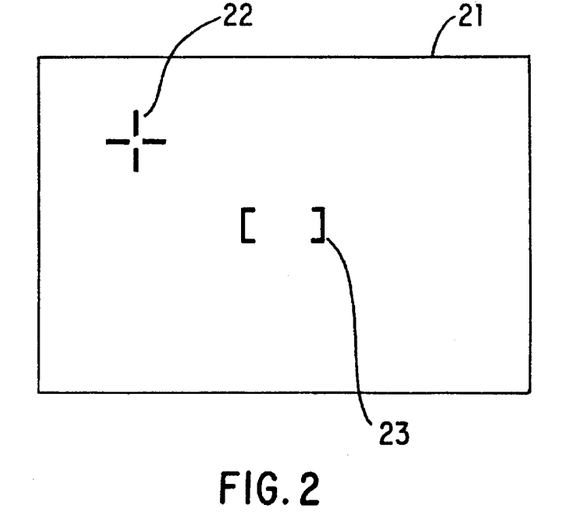
FIG. 2 is a front view showing an example of the display in the finder of both a camera equipped with a photometric value correction device according to the present invention and a conventional camera.

With a camera equipped with a line of vision detection device for detecting the line of vision of the photographer when the photographer looks into the finder, when the point of focus of the photographer is displayed, a mark 22 showing the point of focus is generally superimposed in the finder field 21, as shown in FIG. 2. With a camera in which (automatic focus) AF is possible in multiple locations, when an AF area is displayed during autofocus selection, a mark 23 showing the AF area is generally superimposed in the finder field 21 as shown in FIG. 2.

Figure 3:
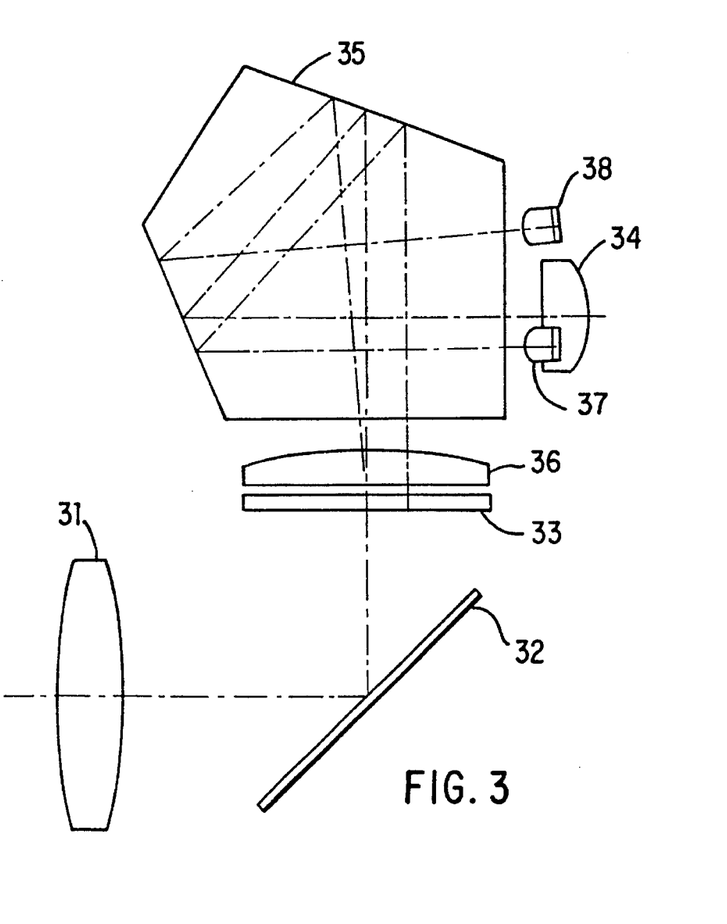
FIG. 3 is a side view showing an example of the photometric and display optical system of both a camera equipped with a photometric value correction device according to the present invention and a conventional camera.
Figure 4:
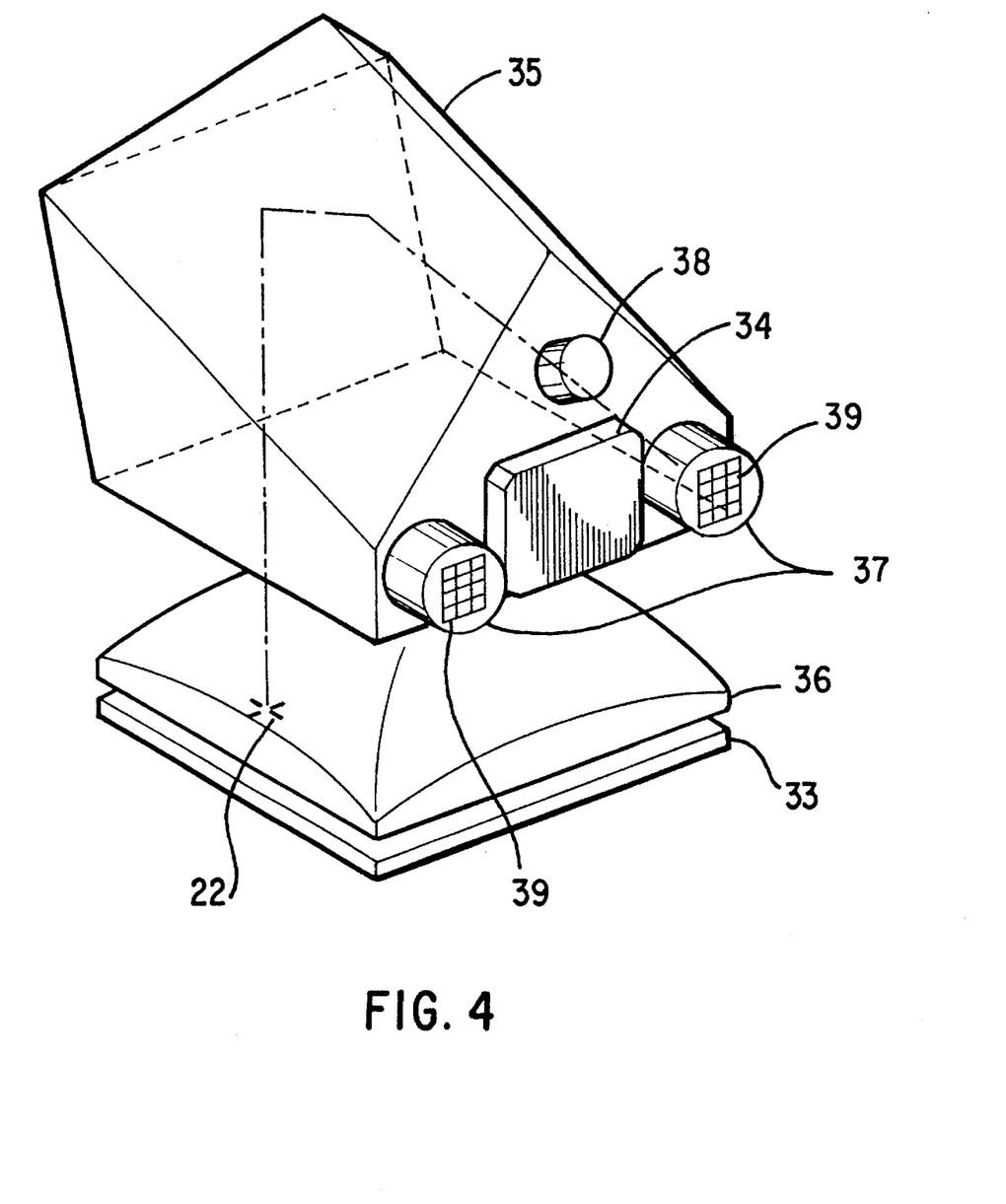
FIG. 4 is a side view showing an example of the photometric and display optical system of both a camera equipped with a photometric value correction device according to the present invention and a conventional camera.
Figure 5:
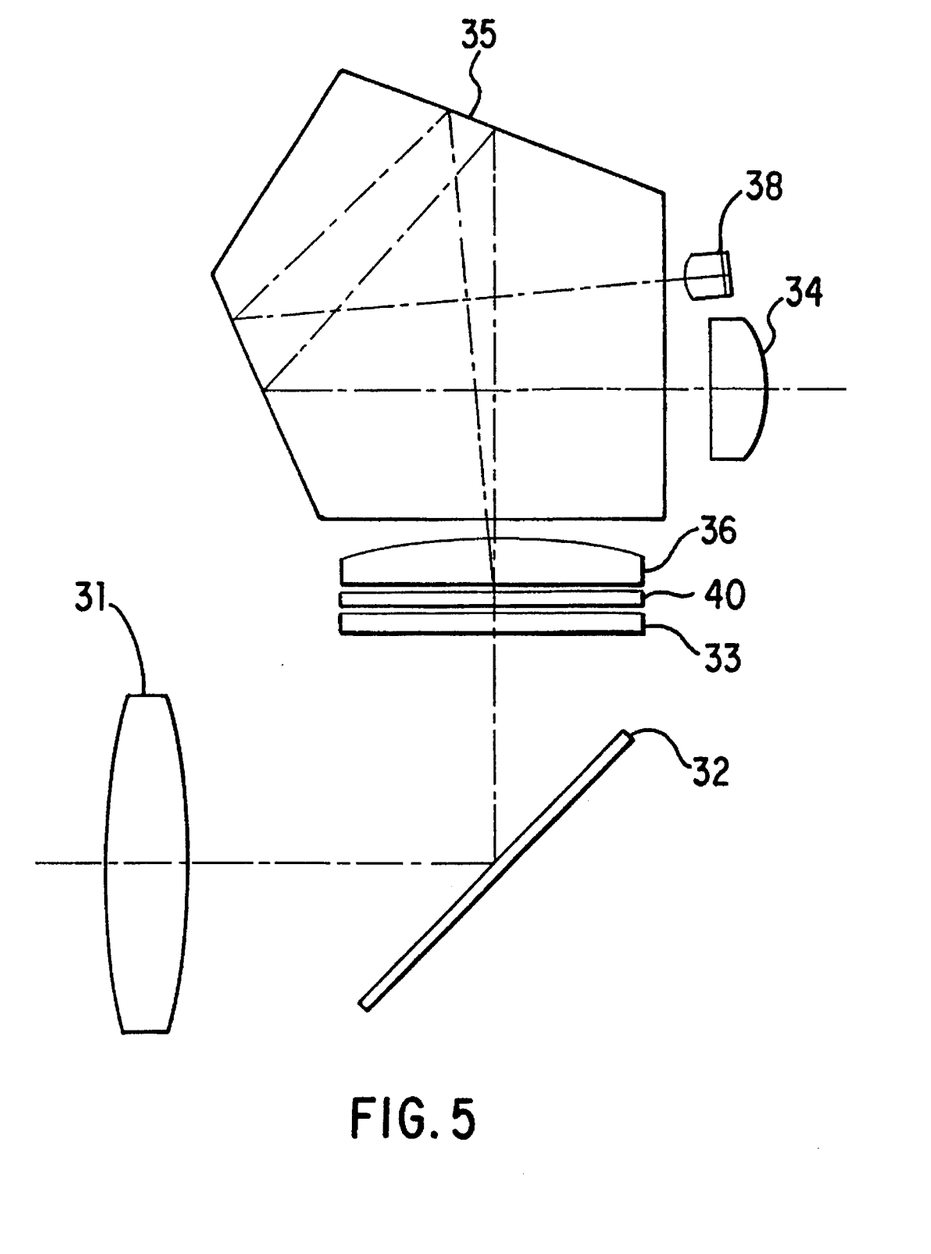
FIG. 5 is a side view showing an example of the photometric and display optical system of both a camera equipped with a photometric value correction device according to the present invention and a conventional camera.

In FIGS. 3–5, an example of a superimposing display device and a photo metering method are shown for use in a single lens reflex camera. In FIG. 3, the subject light that has passed the photo lens 31 is reflected by the mirror 32 and focussed to an image on the screen 33. The subject image on the screen 33 is viewed by the photographer via the eyepiece lens 34, pentagonal prism 35, and condenser lens 36. As shown in FIG. 4, the light radiating elements 37 have light emitting components 39 such as LED's or the like positioned in the form of two-dimensional matrices, which partially illuminate the screen 33 via the pentagonal prism 35 and superimpose the pattern of mark 22 on the screen 33 at an established position. The two light radiating elements 37 are positioned at the left and right sides of the eyepiece lens 34 so as to shine light onto the left half and right half of the finder field, respectively. The finely divided photo metering device 38 measures the light of the subject image on the screen 33 through the pentagonal prism 35. The light from a light radiating element 37 reflected back to the photo metering device 38 increases the measured light intensity to a value higher than the value that would be due to the subject image alone.

FIG. 5 shows another example of a superimposed display, in which a variable transmission display device 40, such as an electronic element or a liquid crystal element, which can electrically change the amount of light transmitted, is positioned between the screen 33 and the condenser lens 36. On the variable transmission display device 40, a contrast is formed with the surrounding areas by decreasing the light transmission of the elements in the fixed coordinate position or positions by applying voltages to these elements, thereby displaying the pattern of mark 22. Therefore, the overall brightness decreases when voltages are applied to these elements. That is, the reduced transmission of the elements decreases the light intensity measured by the photo metering device 38 to a value lower than the value that would be due to the subject image alone.

When photo metering is accomplished with a single lens reflex camera, the photographic field is often divided into regions and so-called "finely divided photo metering" is accomplished. In order to carry out more accurate photo metering and to obtain a better exposure value, the number of divisions of the field can be increased. However, since the individual light measuring regions become smaller as the number of field divisions increase, in regions in which there is a superimposed mark or character, changes in the brightness or light transmission of the mark or character can influence the photometric value of the region in which the character exists.

SUMMARY OF THE INVENTION

The present invention has been conceived in light of the above-mentioned problem. It is an object of the present invention to correct the influence on the photometric value of the mark or character superimposed in the finder field when the field is finely divided and to make possible constantly obtaining a proper exposure value.

In order to accomplish this and other objectives, a camera equipped with a photometric value compensation device of the present invention includes a finely divided photo metering device that divides the photographic field into multiple areas, measures the light intensity or brightness in each area, and transmits this information as a photometric brightness value; a photographic information display device that superimposes photographic information inside the finder field; a correction area determining device that determines the photometric areas for which photometric value correction is necessary based on the influence of the brightness of the photographic information display in the photometric areas of the finely divided photo metering device; and a correction device that carries out correction calculations for the photometric brightness values obtained from photometric areas determined by the correction area determining device.

With a camera equipped with a photometric value compensation device constructed as described above, since photometric value correction is accomplished for photometric areas based on the influence of the mark display, a precise exposure value can be obtained that is not influenced by the brightness or change in light transmission of the superimposed display.

BRIEF DESCRIPTION OF THE DRAWINGS

Embodiments of the present invention will be described hereafter, with reference to the following drawings, in which.

DETAILED DESCRIPTION OF PREFERRED EMBODIMENTS

Figure 1:
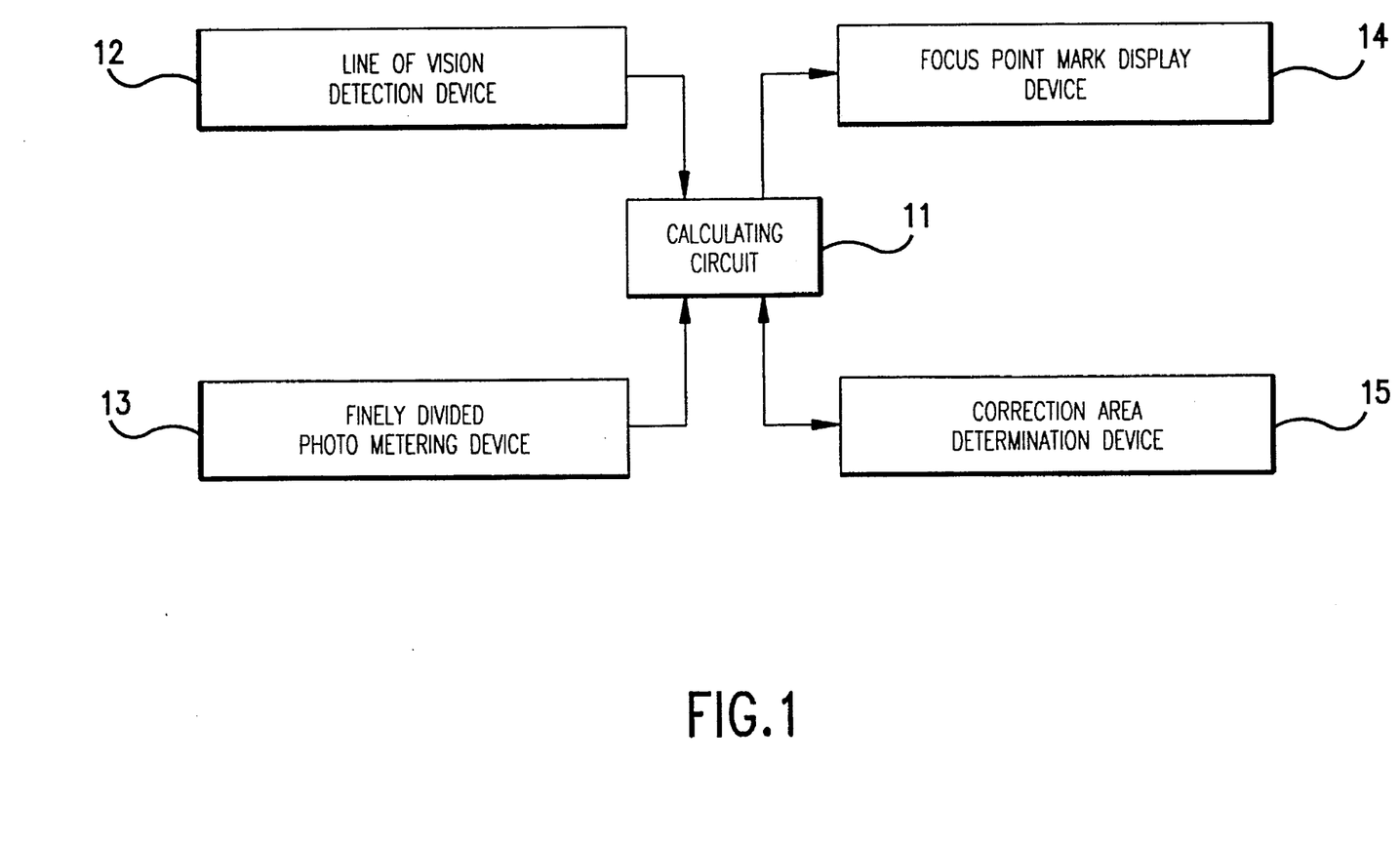
FIG. 1 is a block diagram showing an embodiment of a camera equipped with a photometric value correction device according to the present invention.

FIG. 1 is a block diagram showing an embodiment of a camera equipped with a photometric value compensation device according to the present invention.

With reference to FIG. 1, a line of vision detection device 12 detects the line of vision of the photographer. A photographic information display device, such as focus point mark display device 14 superimposes into the finder field a display of the focus point position detected by the line of vision detection device 12. A finely divided photo metering device 13 divides the finder field into multiple areas, measures the light intensity of each area, and transmits information based on the measured light intensity of each area as a photometric brightness value to a correction device, such as calculating circuit 11 that calculates a corrected brightness value for areas of the finder field where correction is to be made. A correction area determination device 15 determines those areas that need correction based on the brightness of the focus point mark display in the different areas.

Figure 6:
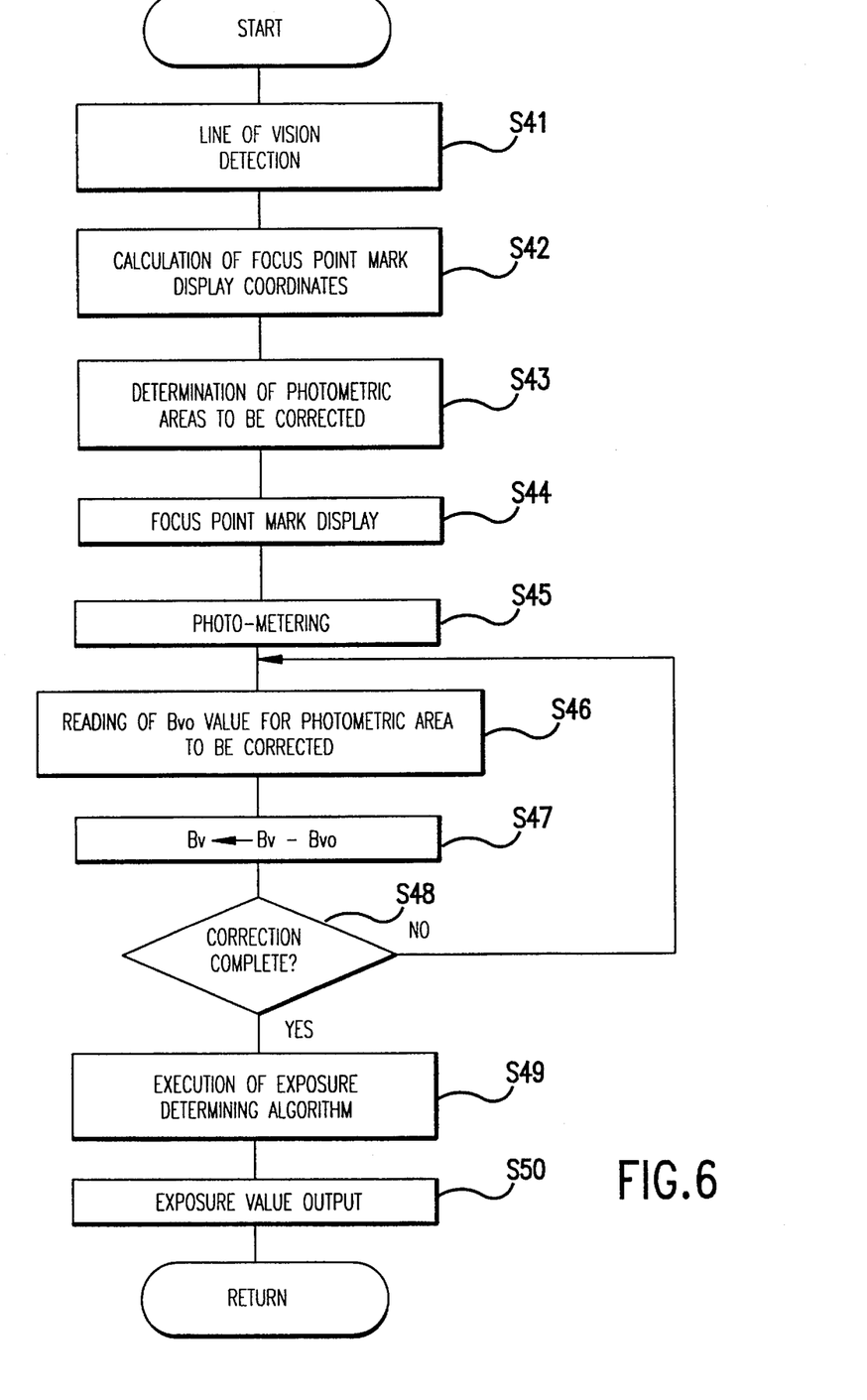
FIG. 6 is a flow chart showing an embodiment of a camera equipped with a photometric value correction device according to the present invention.

An example of the operating sequence of the calculating circuit 11 is described hereafter, with reference to FIG. 6.

First, in step S41, the position of the line of vision is detected by the line of vision detection device 12, the display coordinates of the focus point mark being calculated in step S42. In step S43, using the focus point mark display coordinates calculated in step S42, it is determined which photometric areas have been influenced by the brightness of the focus point display mark.

Figure 7:
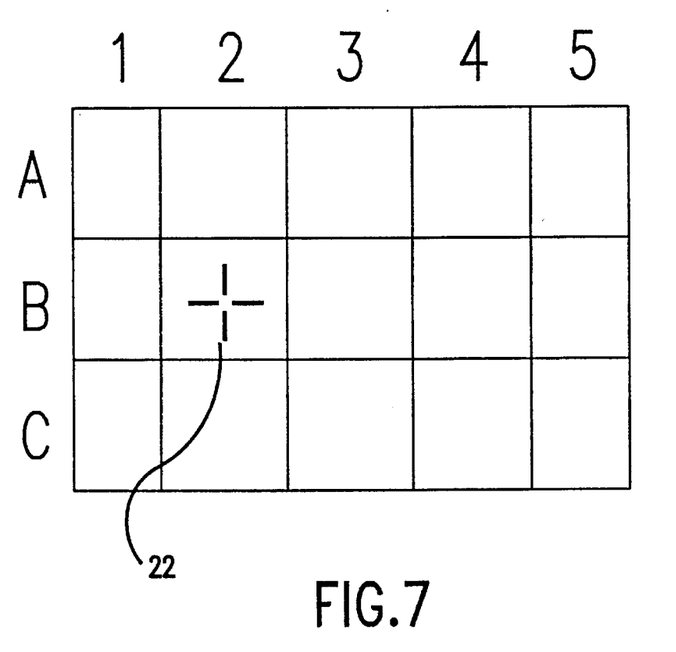
FIG. 7 is a front view that shows a first embodiment of the relationship between the field division and display mark on a camera equipped with a photometric value correction device according to the present invention.
Figure 8:
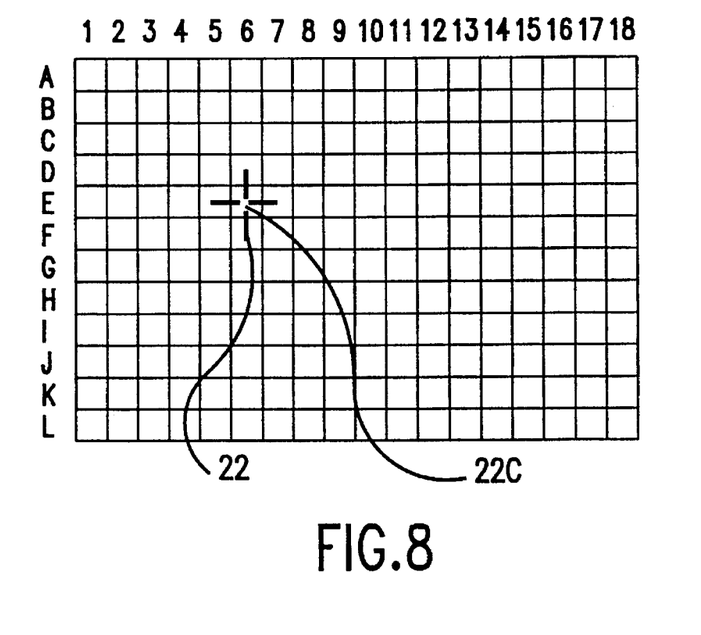
FIG. 8 is a front view that shows a second embodiment of the relationship between the field division and display mark on a camera equipped with a photometric value correction device according to the present invention.

This determination means that if the finder field is divided into 15 areas, as shown in first embodiment in FIG. 7, the photometric area B2 that completely includes the focus point mark 22 is selected as the area to be corrected. In a second embodiment in FIG. 8, the number of field divisions, or photometric areas, is greater than in FIG. 7, and the photometric areas that are influenced by the display of the focus point mark 22 are D6, E5, E6, E7 and F6. The focus point display mark overlaps those areas.

In step S44, the focus point mark is displayed according to the coordinates calculated in step S42, the order of steps S43 and S44 being interchangeable. In step S45, the light is measured by the finely divided photo metering device 13 and the photometric value, or Bv value, is calculated for each photometric area. In step S46, the reading of the correction value Bvo that corresponds to the photometric areas determined in step S43 is accomplished according to a correction value table shown in portion in FIG. 9. The correction value table shows the light intensity changes caused by the photometric value of the display mark light or the variable light transmission display device 40 when the field is dark, these values having been calculated in advance for each display position and presented in tabular form, with the display mark coordinates matching the photometric area coordinates. Since the center 22C of the focus point mark 22 and the photometric area E6 in FIG. 8 correspond to a single area, if the central coordinates of the focus point mark 22 are calculated, the photometric areas that are influenced by the brightness of the focus point mark can be easily determined from the corresponding coordinates.

Figure 9:
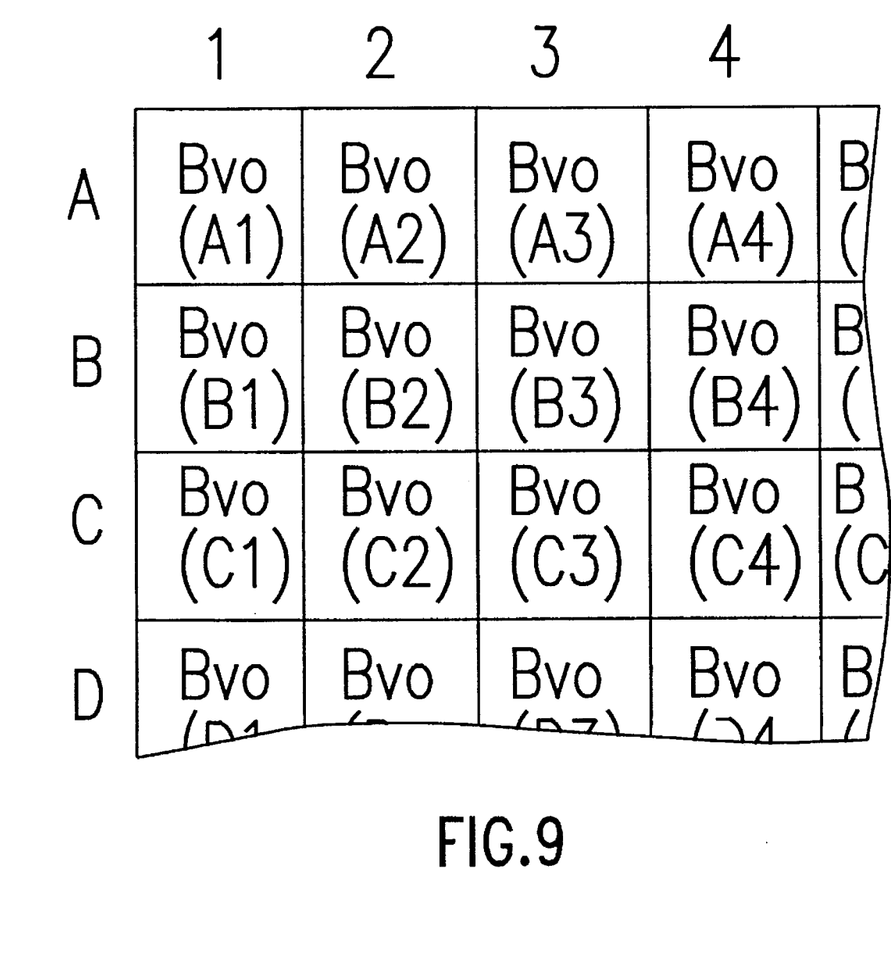
FIG. 9 is a conceptual drawing that shows the photometric value correction data of an embodiment of a camera equipped with a photometric value correction device according to the present invention.

In step S43, if, for example, the photometric area C3 is selected to be corrected, the Bvo (C3) value that corresponds to coordinate C3 on the correction value table (FIG. 9) is read, a correction being accomplished in step S47 using the Bvo (C3) value for the Bv value (By (C3)) of the area (coordinate C3) that is to be corrected. Correction is accomplished according to such calculations as $$Bv (C3) - Bvo (C3) \ldots \qquad (1)$$

and $$Bv (C3) \times Bvo (C3) \ldots \qquad (2).$$

In step S48, a determination is made as to whether the corrections have all been accomplished for the areas requiring correction; if the corrections have all been completed, the program proceeds to step S49; if the corrections have not been completed, the program returns to step S46. In step S49, a set algorithm is executed that relates to the finely divided photo metering, using the photometric values that have been calculated for each area, the exposure value being output in step S50, thereby completing one cycle of the procedure.

When photometric correction methods other than the method that uses the correction value Bvo from the correction value table are used, for example, when R (a constant) is used as the brightness correction value, the following equations can be used:

$$Bv (C3) - R \ldots \qquad (3)$$

and $$Bv (C3) \times R \ldots \qquad (4).$$

In this case, since the influence of an LED (the light emitting component 39) or the like is the same for each area, there is no need to use the correction value table.

In addition, the photographic information displayed inside the finder field is not limited to the focus point mark and AF area display mark.

According to the embodiment described above, when photo metering is accomplished that finely divides the field, since influences on the photometric value of the brightness of the display mark or character superimposed in the finder field or of changes in light transmission are corrected, the proper exposure value can be calculated. In addition, since the display mark coordinates correspond to the photometric area coordinates, and since the center of the display mark corresponds to the center of the photometric area, if the central coordinates of the display mark are calculated, the photometric areas that are influenced by the brightness of the focus point mark can be easily determined from the corresponding coordinates.

As described above, according to the camera equipped with a photometric value correcting device of the present invention, since correction is accomplished for photometric areas that are influenced by the mark display, a proper exposure value can always be obtained without the photometric value being influenced by marks or characters that are superimposed in the finder field.

While this invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention as defined in the following claims.

What is claimed is:

1. A camera equipped with a photometric value compensating device, said camera comprising:

a finder including a finder field;

a photographic information display that superimposes photographic information inside the finder field;

a photo metering device that divides said finder field into multiple areas, measures the light intensity of each area, and transmits information based on the measured light intensity of each area as a photometric brightness value;

a correction area determining device that determines at least one area of said multiple areas for correction of said photometric brightness value of said at least one area based on the brightness of said photographic information in said at least one area; and a correction device that calculates a corrected brightness value based on said photometric brightness value for each area that said correction area determining device has determined for correction.

2. A camera equipped with a photometric value compensating device according to claim 1, further comprising a line of vision detection device that detects the line of vision of a photographer to determine a point of focus, and wherein said photographic information display device superimposes a display of said point of focus inside said finder field.

3. A camera equipped with a photometric value compensating device according to claim 2, wherein said correction device determines the coordinates of said point of focus display in said finder field and said correction area determining device determines for correction only the area with the same coordinates as said point of focus display.

4. A camera equipped with a photometric value compensating device according to claim 2, wherein said correction device determines the center coordinates of said point of focus display in said finder field, and said correction area determining device determines for correction the area with the same coordinates as said point of focus display and at least one adjacent area.

5. A camera equipped with a photometric value compensating device according to claim 1, wherein, for each area that said correction area determining device has determined for correction, said correction device determines a correction value based on the coordinates in said finder field of each area determined for correction and calculates said corrected brightness value for each area determined for correction based on said correction value and on said photometric brightness value.

6. A camera equipped with a photometric value compensating device according to claim 5, wherein said correction device determines a correction value from a correction value table including different correction values for different areas in said finder field.

7. A camera equipped with a photometric value compensating device according to claim 1, wherein said correction device determines a constant correction value and calculates said corrected brightness value based on said constant correction value and on said photometric brightness value for each area that said correction area determining device has determined for correction.

8. A camera equipped with a photometric value compensating device according to claim 1, wherein said correction device comprises a calculating circuit.

9. A camera equipped with a photometric value compensating device, said camera comprising:

a finder including a finder field;

means for superimposing photographic information inside said finder field;

means for dividing said finder field into multiple areas and measuring the light intensity of each area;

means for transmitting information based on the measured light intensity of each area as a photometric brightness value;

means for determining at least one area of said multiple areas for correction of said photometric brightness value of said at least one area based on the brightness of said photographic information in said at least one area; and means for calculating a corrected brightness value based on said photometric brightness value for each area that said determining means has determined for correction.

10. A camera equipped with a photometric value compensating device according to claim 9, further comprising means for detecting the line of vision of the photographer to determine a point of focus, and wherein said means for superimposing photographic information includes means for displaying a display of said point of focus superimposed in said finder field.

11. A camera equipped with a photometric value compensating device according to claim 10, wherein said means for calculating determines the coordinates of said point of focus display in said finder field and said determining means determines for correction only the area with the same coordinates as said point of focus display.

12. A camera equipped with a photometric value compensating device according to claim 10, wherein said calculating means determines the center coordinates of said point of focus display in said finder field and said determining means determines for correction the area with the same coordinates as said point of focus display and at least one adjacent area.

13. A camera equipped with a photometric value compensating device according to claim 9, wherein, for each area that said determining means has determined for correction, said calculating means determines a correction value based on the coordinates in said finder field of each area determined for correction and calculates said corrected brightness value for each area determined for correction based on said correction value and on said photometric brightness value.

14. A camera equipped with a photometric value compensating device according to claim 9, wherein said calculating means determines a constant correction value and calculates said corrected brightness value based on said constant correction value and on said photometric brightness value for each area that said determining means has determined for correction.

15. A method of determining brightness values for exposure calculations in a camera equipped with a photometric value compensating device and including a finder with a finder field, comprising the following steps:

(a) superimposing photographic information inside said finder field;

(b) dividing said finder field into multiple areas;

(c) measuring the light intensity in each area of said multiple areas;

(d) determining a photometric brightness value of each area based on the measured light intensity of each area;

(e) determining at least one area of said areas for correction of the measured brightness value of said at least one area based on the brightness of said photographic information in said at least one area; and (f) calculating a corrected brightness based on said photometric brightness value for each area determined for correction.

16. A method according to claim 15, further comprising:

(g) detecting the line of vision of a photographer;

(h) determining a point of focus in said finder field based on the detected line of vision;

(i) displaying said point of focus in said finder field as at least part of said photographic information.

17. A method according to claim 16, wherein said displaying step (i) includes displaying said point of focus display completely within one of said areas.

18. A method according to claim 16, wherein said displaying step (i) includes displaying said point of focus display overlapping a plurality of said areas.

19. A method according to claim 16, further comprising:

(j) determining the coordinates of said point of focus display in said finder field; and (k) determining for correction in step (e) only the area with the same coordinates as said point of focus display.

20. A method according to claim 16, further comprising:

(j) determining the center coordinates of said point of focus display in said finder field; and (l) determining for correction in step (e) the area with the same coordinates as said point of focus display and at least one adjacent area.

21. A method according to claim 15, wherein said calculating step (f) comprises:

(f1) determining, for each area determined for correction, a correction value based on the coordinates in said finder field of each area determined for correction; and (f2) calculating said corrected brightness value for each area based on said correction value and on said photometric brightness value.

22. A method according to claim 21, wherein said step (f1) comprises determining a correction value from a correction value table including different correction values for different areas in said finder field.

23. A method according to claim 15, wherein said calculating step (f) comprises:

(f1) determining a constant correction value; and (f2) calculating said corrected brightness value based on said constant correction value and on said photometric brightness value for each area determined for correction.

24. A method according to claim 15, wherein said calculating step (f) comprises calculating a corrected brightness value using a calculating circuit.

* * * * *